March 29, 1955
S. S. McINTYRE
2,705,175
FRAME SUSPENSION FOR A HOISTING ENGINE
MOUNTED ON CRAWLER TRACKS
Filed Nov. 7, 1950
4 Sheets-Sheet 4
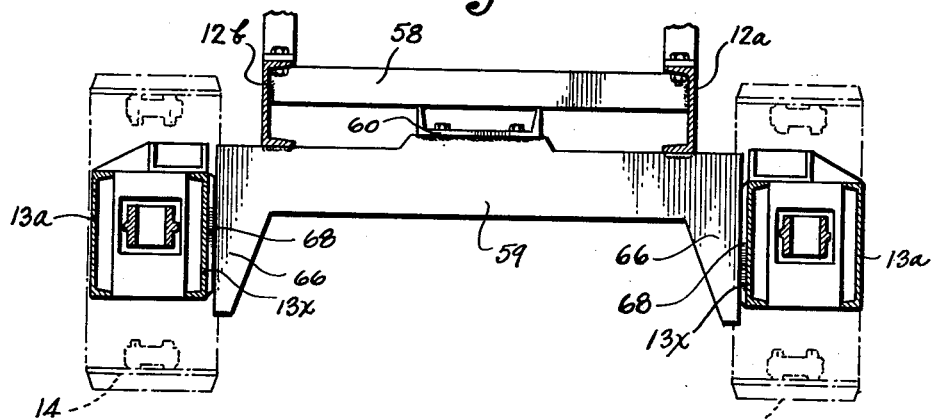
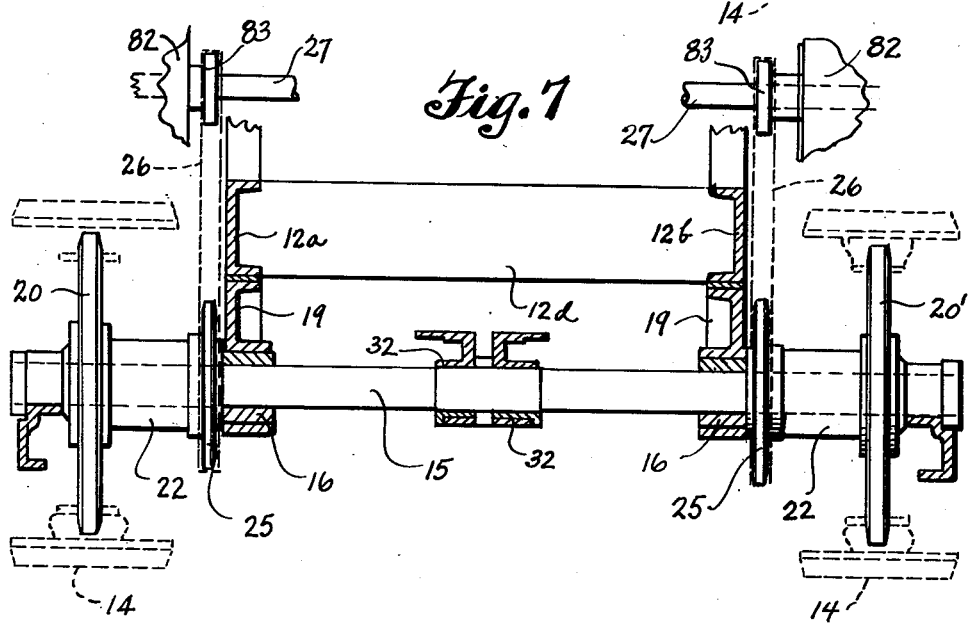
INVENTOR.
SIDNEY S. McINTYRE
BY
Cook & Robinson
ATTORNEYS

United States Patent Office 2,705,175
Patented Mar. 29, 1955

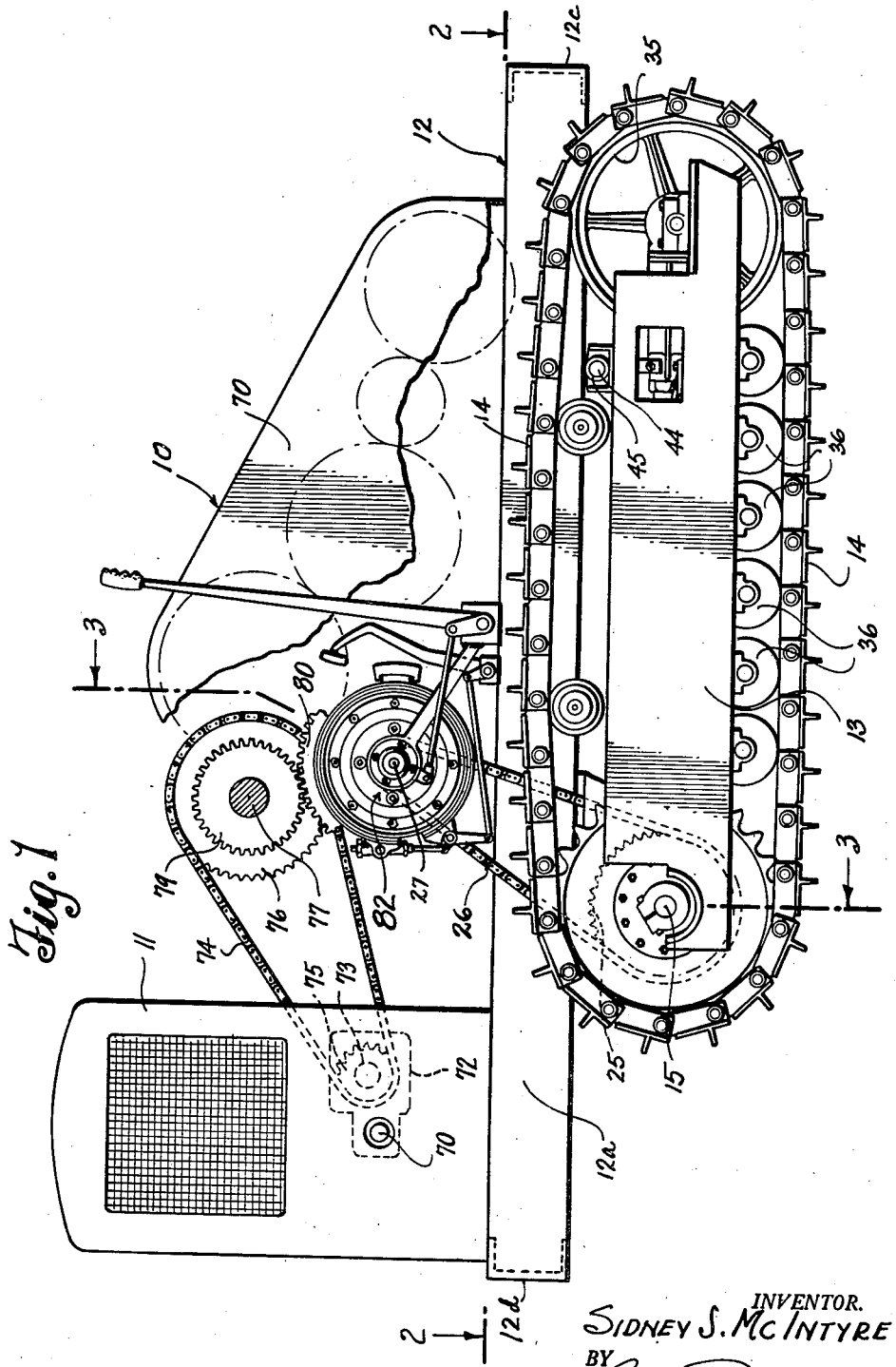

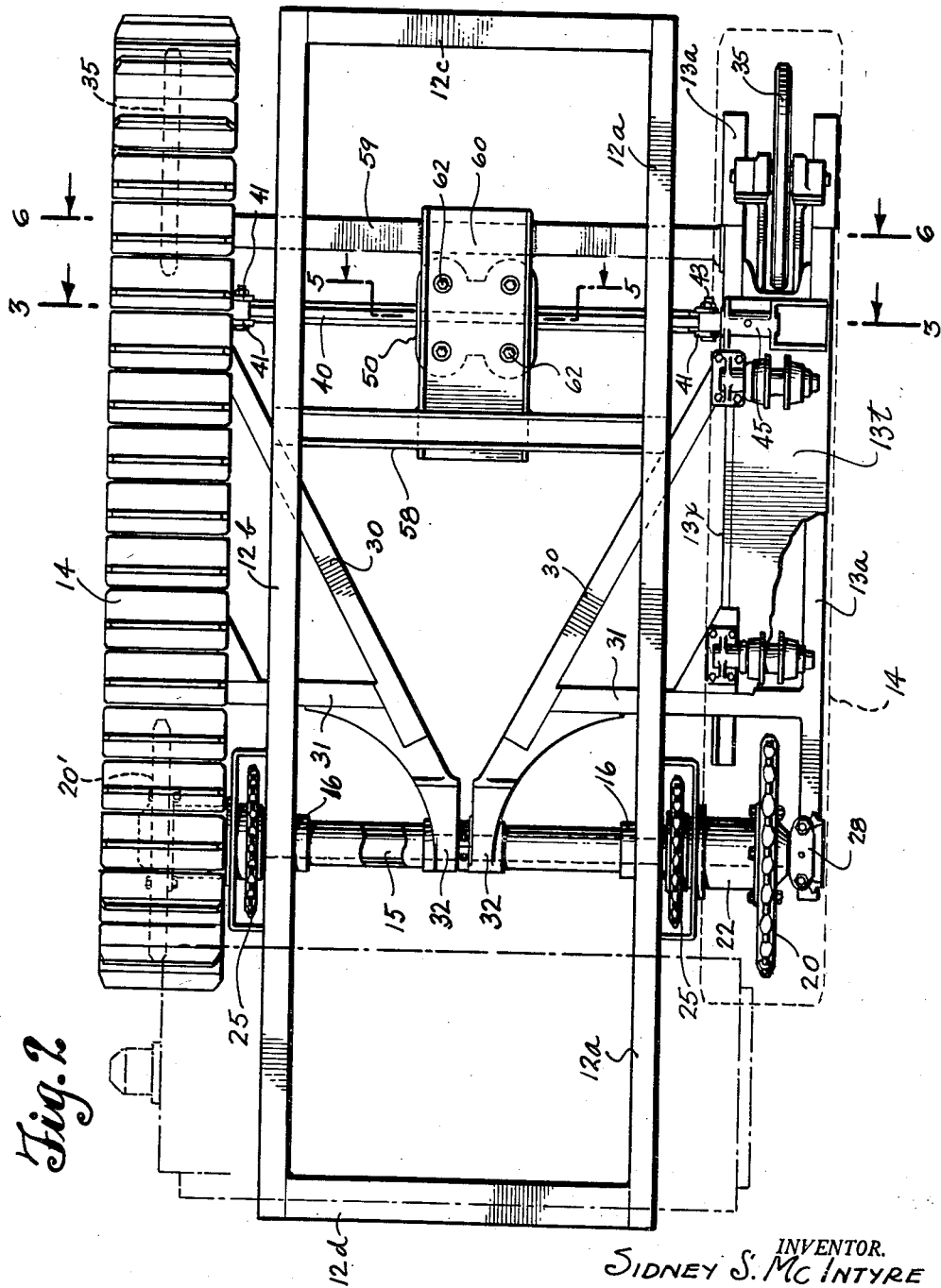

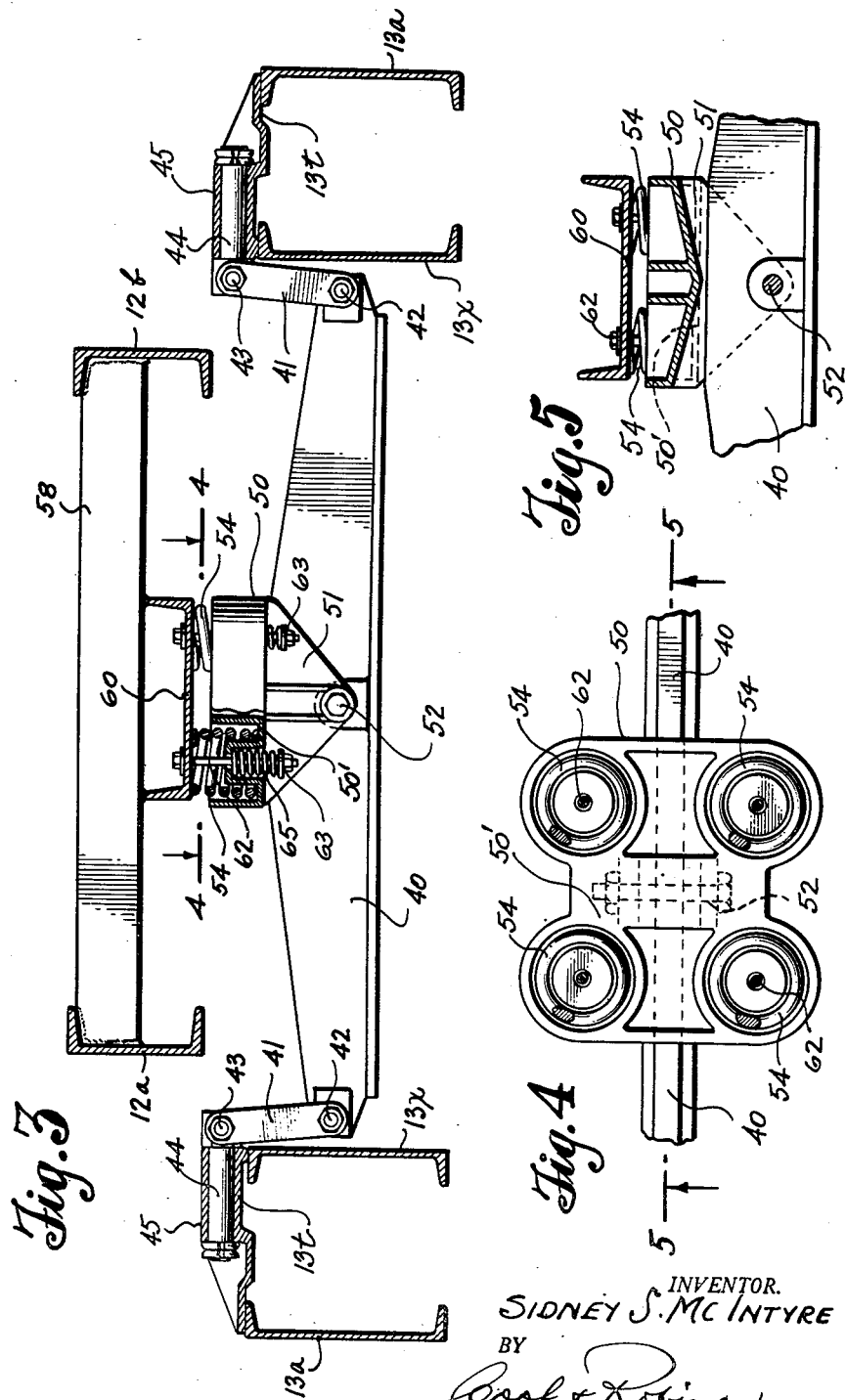

2,705,175

FRAME SUSPENSION FOR A HOISTING ENGINE MOUNTED ON CRAWLER TRACKS

Sidney S. McIntyre, Sedro Woolley, Wash.

Application November 7, 1950, Serial No. 194,532

2 Claims. (Cl. 305—9)

This invention relates to improvements in frame suspension means, for machines such as hoisting engines, yarders or the like, as mounted on crawler tracks.

It is a common practice to mount donkey engines, or engines as used for the loading and yarding of logs, on sled runners and to drag these sled mounted engines from one setting to another. Such method of transporting or moving in the woods or on highways is an expensive and often a dangerous operation, since the runners, which are usually made of logs, wear rapidly and their guiding or steering is difficult. Furthermore, travel is exceedingly slow. When such sleds are moved by truck, it is necessary, or at least it is most practical, to remove the heavy engine from the sled runners, and this adds to the time and labor required for making changes in location.

Heretofore, the substitution of crawler tracks for the commonly used sleds has not been considered practical because of cost, and also because no reliable or satisfactory mechanism was available both for carrying the weight and providing the necessary traction to move it over logging roads. Yarder and loader cable winding drums, as attachments for tractors on conventional types of crawler tracks are extensively used in the lumbering industry, but the capacity of such attachments is limited to the capacity of the tractor to carry auxiliary weights. It is of significance to note here that crawler tractors are not now designed to safely carry the weight of the common types of yarders, especially when moved in wooded areas where terrain is exceedingly rough or irregular.

In view of the inadequacy of present day frame suspension means as used in crawler type tractors for the support and transportation of exceeding heavy loads over rough and irregular terrain, it has been the principal object of the invention to provide a new and practical front end suspension system that will carry the total weight and sustain all required side thrust to which the tracks, track frames and their supports may be subjected, yet flexible enough to allow the necessary and permitted oscillation of the tracks about their mounting axis and to provide a reliable and simplified way of attaching the crawler track frame supports to the hoist or like frame.

In accomplishing the above mentioned and other objects of the invention, I have provided the improved details of construction, the preferred forms of which are illustrated in the accompanying drawings, wherein—

Fig. 1 is a side view of a yarder engine and cable winding mechanism mounted on crawler tracks, and embodying the improvements of the present invention therein.

Fig. 2 is a top, or plan view of the crawler tracks and base frame of the yarder; the engine and cable winding drums being removed for better showing of these parts.

Fig. 3 is a cross-section, substantially on the line 3—3 in Fig. 2, showing the front end suspension and equalizer for the crawler track frames.

Fig. 4 is a horizontal section taken on line 4—4 in Fig. 3.

Fig. 5 is a vertical section substantially on line 5—5 in Fig. 2.

Fig. 6 is a vertical cross-section on line 6—6 in Fig. 2.

Fig. 7 is a vertical cross-sectional detail of the track frame mountings and track driving sprockets.

Referring more in detail to the drawings—

In Figs. 1 and 2, I have shown in side view and plan, respectively, a mobilized unit in which those parts which are comprised by the present invention are shown in a preferred arrangement. For purpose of illustration only, the present suspension means for the crawler tracks is shown as applied to a log yarding engine. It is to be understood, however, that the invention is not to be confined to any specific machine, but shall apply to any unit where exceedingly heavy loads are to be moved over rough and irregular terrain.

That particular equipment which is employed for the yarding of logs, including cable winding drums and their controls, herein referred to as the "yarder" is designated in its entirety in Fig. 1, by reference character 10. The engine, or power unit which furnishes power for the yarder and also for the steering and driving of the crawler tracks is designated by numeral 11. The base frame, which mounts the engine and yarder thereon, and to which the present suspension means for the crawler tracks is applied, is designated by numeral 12. The track frames, located at opposite sides of the machine, lengthwise thereof, are designated by reference numerals 13—13 and the crawler tracks which travel about these frames are designated by numerals 14—14.

The base frame structure 12, which mounts the yarder mechanism, as shown in Fig. 2, comprises the opposite side beams 12a and 12b, joined at front and rear ends by cross beams 12c and 12d or by other suitable means. To mount this frame on the crawler tracks, it is provided near its rear end, with a supporting axle 15, which, as seen in Fig. 7, is mounted in bearings 16—16 formed on brackets 19—19 that are secured to and which extend downwardly from the undersides of the beams 12a and 12b. The opposite end portions of the cross-axle 15 extend beyond the side beams of the base frame, and have sprocket wheels 20—20', for mounting and driving the crawler tracks 14—14', revolubly mounted thereon.

Each sprocket wheel 20 is fixed coaxially to the outer end of a cylindrical hub member 22 that is mounted, to rotate about the end portion of the axle. At their inner ends, the hub members 22 are equipped with driving sprocket wheels 25, about which chain belts 26 operate as has been shown in Fig. 1, to drive the crawler tracks.

The specific means whereby the crawler tracks are driven for the moving and steering of the machine is of no particular significance in the present invention, and it may comprise the conventional or any suitable form of driving mechanism. However, I have shown, in Fig. 1, the engine 11 to have a drive shaft 70, connected through conventional reversing and speed changing gearing, contained in a housing indicated at 72, with a drive shaft 73 on which a sprocket wheel 75 is fixed. A sprocket chain belt 74 operates about the sprocket wheel 75 and a larger sprocket wheel 76 fixed on a cross shaft 77 that is revolubly mounted in the frame structure of the yarder 10 for driving the various cable winding drums or other mechanisms.

Fixed on shaft 77 is a gear wheel 79, in mesh with a gear 80 fixed on a cross shaft 27 that is mounted in the yarder frame. Associated with the cross shaft 27, at its opposite ends, are clutch and brake assemblies, one of which is designated generally at 82 in Fig. 1. Each of these has a small sprocket wheel 83 associated therewith, as in Fig. 7, coaxial of shaft 27, and over which the driving sprocket chain belt 26 for the corresponding crawler track operates to provide a driving connection between shaft 27 and the crawler tracks. When both clutches are set, both tracks are driven in unison. By the selective setting and releasing of the clutches in conjunction with the setting and releasing of the brakes, the steering of the vehicle is accomplished.

Referring more particularly to Fig. 2, it will be noted that the crawler tracks 14—14 are located in parallel relationship at the outside of the main frame 12. Each track frame extends forwardly from the cross axle 15 and is adapted to oscillate thereon as provided for by the front end suspension and equalizer mechanism presently described. Each track frame comprises a longitudinally extending outside beam 13a, equipped at its rear end with a bearing 28 whereby it is mounted on the corresponding end of the cross axle 15, and an inside beam 13x, parallel with and rigidly attached to the outside beam by a top plate 13t, but terminating short of the cross axle 15. Each track frame is braced against lateral movement at its forward end by a brace frame structure comprising a diagonally directed inside beam 30, and a leg 31 that extends from the inner end portion of beam 30 to the rear end portions of the side beams 13a and 13x of the corresponding track frames, and is rigidly attached thereto. At their forward ends, the beams 30 are fixed rigidly to the corresponding inside beams of the track frames and at their rear ends are fixed to bearings 32 rotatably fitted to the cross axle 15 adjacent the center line of the machine. Thus, the brace frames hold the track frames against lateral movement yet do not in any way interfere with their independent oscillation. The two crawler tracks are mounted for operation about the track frames and are driven by the sprocket wheels 20—20 in the usual way.

The crawler tracks, per se, may be of any suitable link construction, and mounted in any suitable way. It is shown, however, that wheels 35 are mounted in the track frames at their forward ends to carry the crawler track belts thereover and the lower runs of the belts are arranged for travel on a succession of rollers 36 mounted on the track frames along the lower edges.

For the support of the forward end of the main frame 12 from the crawler tracks, I have provided an equalizing suspension mechanism shown in Figs. 2 and 3. This comprises a cross beam 40 that extends between the forward ends of the track frames, as in Fig. 3, terminating just within the adjacent track frame members 13x—13x. It is equipped at each of its opposite ends with a pair of suspending links 41—41. At their lower ends, the links are secured by pivot bolts 42 to the ends of the cross beam and at their upper ends they are likewise pivotally attached by pivot bolts 43 to the inner end of horizontal stub shafts 44. The stub shafts are rotatably mounted in bearings 45—45 that are fixed in transverse alignment to the top sides of the track frames near their forward ends.

Pivotally supported on the cross beam 40, at a point midway between the track frames, is a spring seat 50. This seat, as seen in Fig. 4, comprises a horizontal plate 50' with spaced, vertical flanges 51—51 extending downwardly therefrom along opposite sides of the cross beam 40 and pivoted thereto by a pivot bolt 52. The plate 50' is thus supported by the beam for relative lateral tilting. Mounted in the spring seat 50, are four vertically disposed coiled springs 54, as shown in Fig. 4, arranged to cooperate for the support thereon of the forward end portion of the base frame 12 through means next described.

It is shown in Fig. 2 that cross beams 58 and 59 are fixed in spaced relationship to the forward portion of the base frame and that a rather short section of channel beam 60 is fixed thereto in the central longitudinal plane of the frame. This channel beam, as seen in Fig. 3, rests upon the upper ends of the four coil springs 54, thus to resiliently mount the forward end of the main frame on the equalizer bar.

Bolts 62 extend downwardly through the channel beam 60 and plate 50', and at their lower ends have nuts 63 threaded thereon whereby small coiled springs 65 are supported under compression against the base plate 50' to yieldingly resist rebound of the frame 12.

For the purpose of sustaining the weight of the mechanism as supported on the base frame 12 when the weight is applied as side thrust against either of the crawler tracks, I have so constructed and arranged the cross beam 59 that it serves this purpose and relieves the cross shaft 15 and its mountings of undesirable strain.

The cross beam 59 is rigidly secured to the under side of the main frame 12 near its forward end, as shown in Fig. 6. It is a rigid, and substantial beam of channel iron form. Its opposite end portions extend somewhat beyond the side beams of the frame, and are there formed with rigid, downwardly directed legs 66—66, each of which has a smooth vertical outside surface extended downwardly along the inside face of the side beam of the corresponding track frame. The track frames are equipped with wear plates 68 to engage with the adjacent leg surfaces, but without friction. The crawler tracks are adapted to freely oscillate on shaft 15 yet when the machine is laterally inclined, as will be the case when traveling along a laterally sloping roadway or side hill, the weight on the machine as supported by frame 12, will be sustained by the track at the lower side. Through the engagement of the leg 66 at the lower end of cross beam 59 with the track frame, no unusual strain due to such tilting will be required to be sustained by the cross axle 15 or the track bracing structures of these tracks.

It is readily apparent, by an inspection of Fig. 2 that the track frames as mounted for oscillation on the cross axle 15 will be sustained in parallel relationship by the brace frames and that, through the equalizer mechanism shown in Fig. 3, the front end of the base frame 12 will be resiliently supported. Furthermore, it will be understood by reference to Fig. 6, that while the cross beam 59 serves to support the weight of lateral forces by contact of its leg portions 66 with the forward ends of the track frames, neither the beam or the legs in any way interfere with the freedom of oscillation of the tracks.

By use of a suspension, and load sustaining means of the character described and illustrated, the lateral spacing of the crawler tracks as well as their length, becomes unlimited, since the track mounting cross-shaft is not subjected to bending strains such as would result from the travel of the machine along a laterally sloping surface, or over uneven surfaces where the weight of the load on frame 12 is caused to be violently thrown toward one side or the other. By locating the beam 59 between the forward ends of the tracks practically all lateral load can be transmitted to the track at the low side, and the size of the cross shaft 15 need not be increased in accordance with spacing or length of the tracks.

The present means for and manner of applying crawler tracks makes it practical to mount exceedingly heavy mechanisms on the frame even when the machine is to be subjected to travel over rough and unlevel terrain, as that encountered in logging operations in the forests of mountain regions.

The present invention is especially applicable to yarders as used in logging operations, but is in no way confined thereto.

Having thus described my invention, what I claim as new therein and desire to secure by Letters Patent, is:

1. In a tractor of crawler type including a main frame, track frames extending along opposite sides thereof and pivotally mounted at their rear ends thereon for independent vertical oscillation at their forward ends; a cross beam fixed rigidly to the main frame at its forward end and extending laterally thereof into vertical abutment with said track frames, at their forward ends, an equalizer beam pivotally suspended at its ends from and between the forward end portions of the corresponding track frames, a spring mounting base pivotally supported upon the equalizer beam at a point medially of its ends for limited lateral oscillation, a spring mounting plate fixed to the under side of the main frame directly above the normal position of said spring mounting base, a plurality of springs disposed between the said base and the said spring mounting plate to support the forward end of the main frame thereon and tie bolts extended between the said base and said plate to limit the expansion of the said springs, and other springs applied about the bolts and serving to yieldingly resist rebound.

2. In a tractor of crawler track type including a main frame, track frames extended along opposite sides thereof and pivotally mounted at their rear ends on said frame for its support at that end, and permitting the independent vertical oscillation of the track frames at their forward ends, a cross beam fixed rigidly to the main frame at its forward end having rigid legs extended downwardly therefrom at its ends between the forward end portions of said track frames, wear plates fixed on the inside faces of the track frames in position for sliding contact with the corresponding legs of said cross beams, an equalizer beam extended between the track frames at their forward ends, links at opposite sides of the main frame with upper ends pivotally fixed to the track frames to permit their swinging laterally and longitudinally of the tracks, and pivotally fixed at their lower ends to opposite ends of the equalizer beam, a spring seat pivoted on the equalizer beam medially of its ends for lateral oscillation only, a bearing plate fixed to the under side of the main frame above the spring seat, and a plurality of coiled springs mounted on the seat and engaged against the bearing plate for the resilient support of the forward end of the main frame and resilient means joining the base and plate to resist and limit rebound.

References Cited in the file of this patent

UNITED STATES PATENTS

| | | |
|---|---|---|
| 1,321,774 | Schneider | Nov. 11, 1919 |
| 1,379,323 | Turnbull | May 24, 1921 |
| 1,402,134 | Austin | Jan. 3, 1922 |
| 1,746,001 | Leake | Feb. 4, 1930 |
| 2,483,308 | Zang | Sept. 27, 1949 |